(12) United States Patent
Williams et al.

(10) Patent No.: US 12,280,960 B2
(45) Date of Patent: Apr. 22, 2025

(54) SPROCKET TOOTH CAP, SPROCKET ASSEMBLY, AND CONVEYOR SYSTEM

(71) Applicant: Intraco, Inc., Oskaloosa, IA (US)

(72) Inventors: Millard M. Williams, Oskaloosa, IA (US); John Adair, Oskaloosa, IA (US); Larry Van Zee, Oskaloosa, IA (US)

(73) Assignee: Intraco, Inc., Oskaloosa, IA (US)

( * ) Notice: Subject to any disclaimer, the term of this patent is extended or adjusted under 35 U.S.C. 154(b) by 123 days.

(21) Appl. No.: 18/213,259

(22) Filed: Jun. 22, 2023

(65) Prior Publication Data

US 2024/0425290 A1 Dec. 26, 2024

(51) Int. Cl.
*B65G 23/06* (2006.01)

(52) U.S. Cl.
CPC .................. *B65G 23/06* (2013.01)

(58) Field of Classification Search
CPC ......... B23F 19/10; B65G 23/00; B65G 23/02; B65G 23/04; B65G 23/06; B65G 15/62; B65G 17/08; B65G 39/02; B65G 39/20
USPC ................ 198/791, 832, 834, 835
See application file for complete search history.

(56) References Cited

U.S. PATENT DOCUMENTS

| | | | |
|---|---|---|---|
| 1,648,550 A * | 11/1927 | Kantor | F16H 55/12 74/448 |
| 3,069,922 A * | 12/1962 | Harvey | F16H 55/30 74/448 |
| 3,381,354 A * | 5/1968 | Krempa | B23F 15/00 29/893 |
| 3,504,562 A * | 4/1970 | Hirych | B62D 55/0963 74/447 |
| 4,195,725 A * | 4/1980 | Jones | B65G 23/44 198/716 |

(Continued)

FOREIGN PATENT DOCUMENTS

| | | |
|---|---|---|
| AT | 260107 B | 2/1968 |
| CN | 211664040 U * | 10/2020 |

(Continued)

OTHER PUBLICATIONS

Smith, "Conveyor Chain Sprockets", Retrieved from: https://en.challengept.com/blog/conveyor-chain-sprockets/, Apr. 19, 2021.

*Primary Examiner* — Kavel Singh
*Assistant Examiner* — Muhammad Awais
(74) *Attorney, Agent, or Firm* — McDonnell Boehnen Hulbert & Berghoff LLP

(57) ABSTRACT

A conveyor system includes a conveyor having an endless loop flexible member and a plurality of inserts. The conveyor system additionally includes a drive shaft and a sprocket coupled to the drive shaft. The sprocket includes a hub and a plurality of teeth extending radially outward from the hub, where at least one tooth is substantially planar and defines a channel having a plate disposed within the channel. The sprocket also includes a sprocket tooth cap fixedly coupled via an interference fit to the tooth and the plate. The sprocket tooth cap includes a first end defining a channel and an engagement face configured to drivingly engage the endless loop flexible member, and a second end defining a cavity. The cavity defining a pair of opposite facing surfaces, where the pair of opposite facing surfaces is configured to form the interference fit with the at least one tooth.

20 Claims, 11 Drawing Sheets

(56) References Cited

U.S. PATENT DOCUMENTS

| | | | | | |
|---|---|---|---|---|---|
| 4,308,019 | A | * | 12/1981 | Horkey | F16H 55/30 198/834 |
| 5,203,861 | A | * | 4/1993 | Irwin | F16H 55/30 474/161 |
| 7,211,014 | B2 | * | 5/2007 | Naude | F16G 13/02 474/49 |
| 9,581,231 | B2 | * | 2/2017 | Pfeiffer | B62M 9/10 |
| 9,777,821 | B2 | * | 10/2017 | Balash | F16H 55/303 |
| 10,640,299 | B1 | * | 5/2020 | Szazdi, Jr. | B65G 43/02 |
| 2014/0333125 | A1 | * | 11/2014 | Hoyt | B62D 55/32 29/893 |

FOREIGN PATENT DOCUMENTS

| | | | | |
|---|---|---|---|---|
| CN | 112460231 A | * | 3/2021 | |
| EP | 3135568 A1 | * | 3/2017 | F16H 55/12 |

* cited by examiner

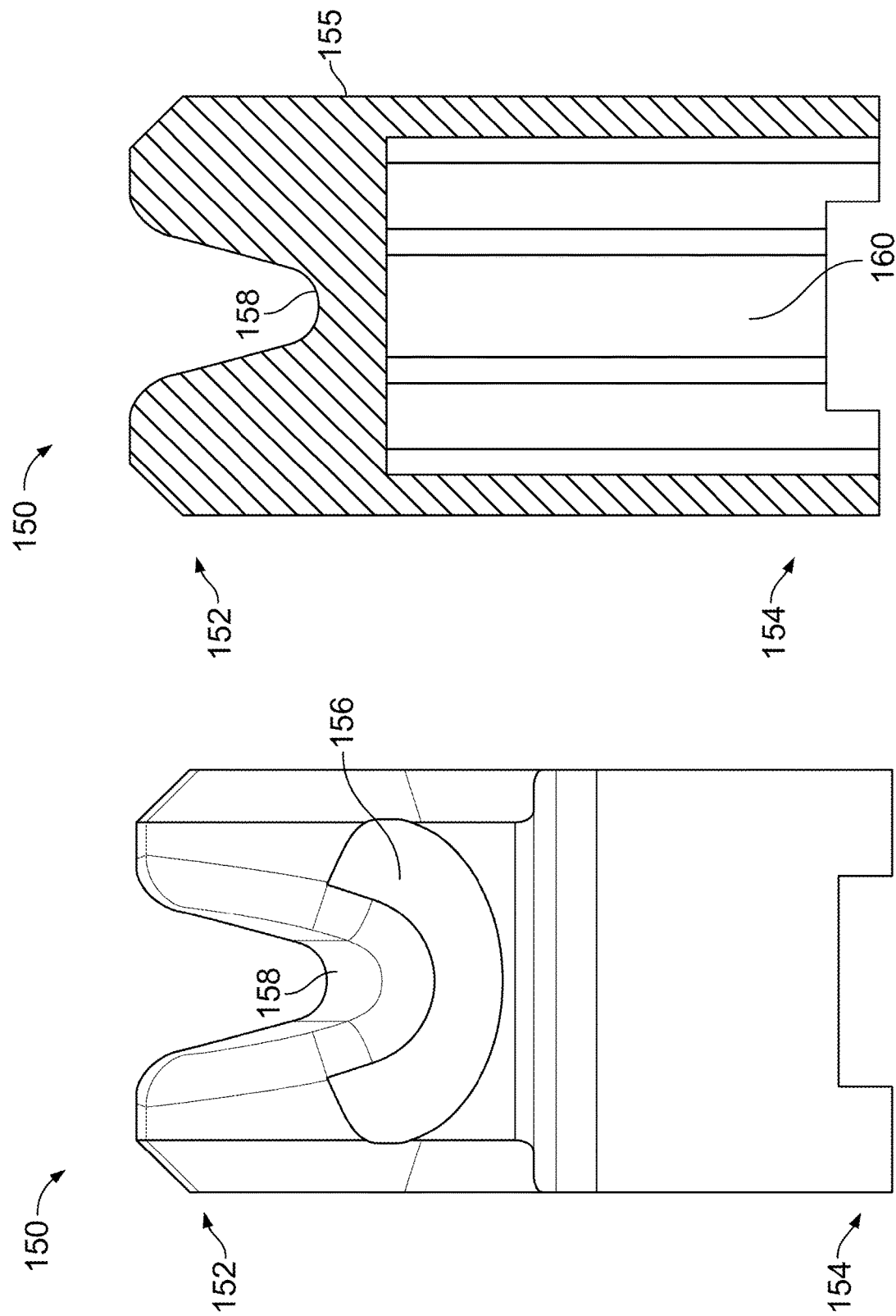

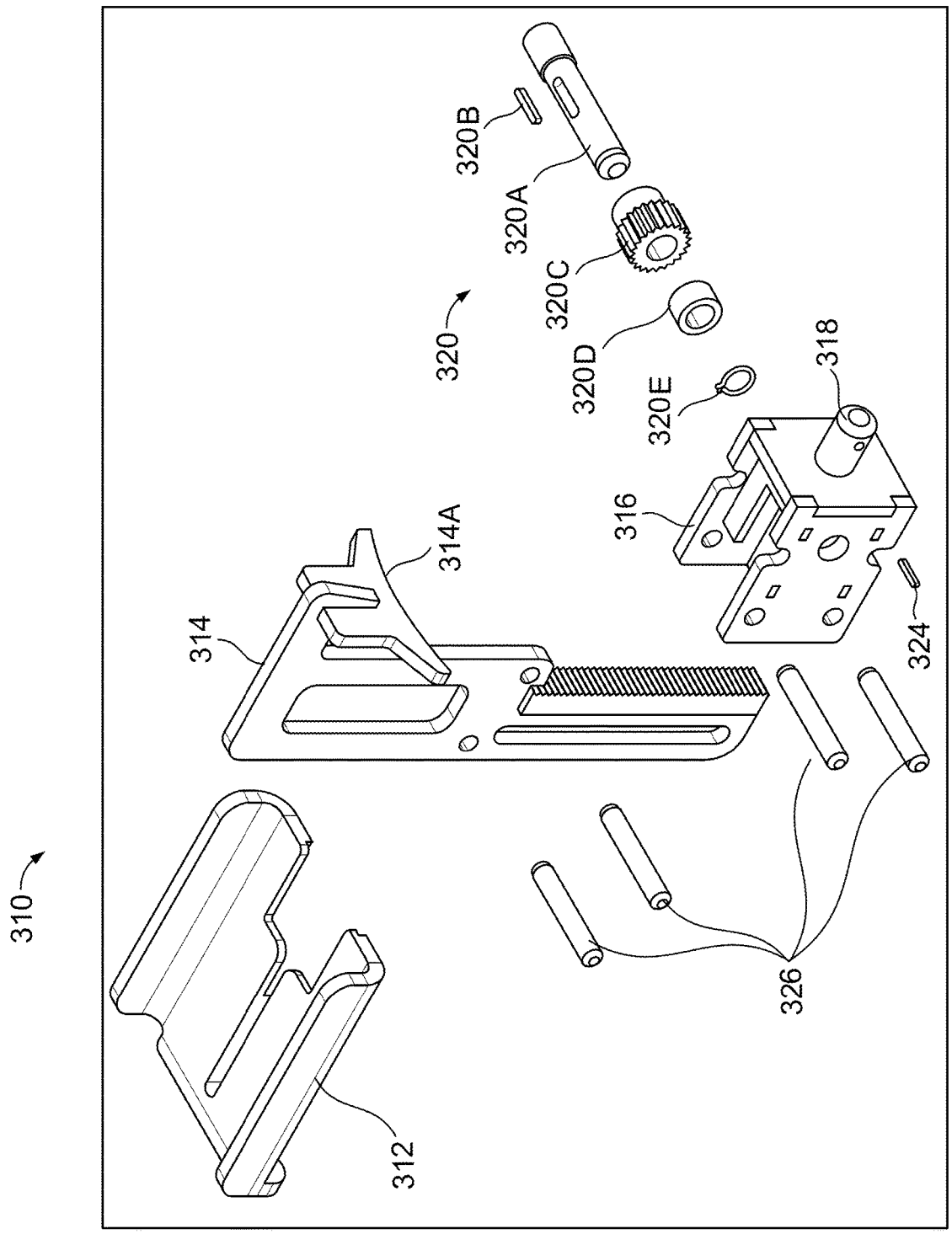

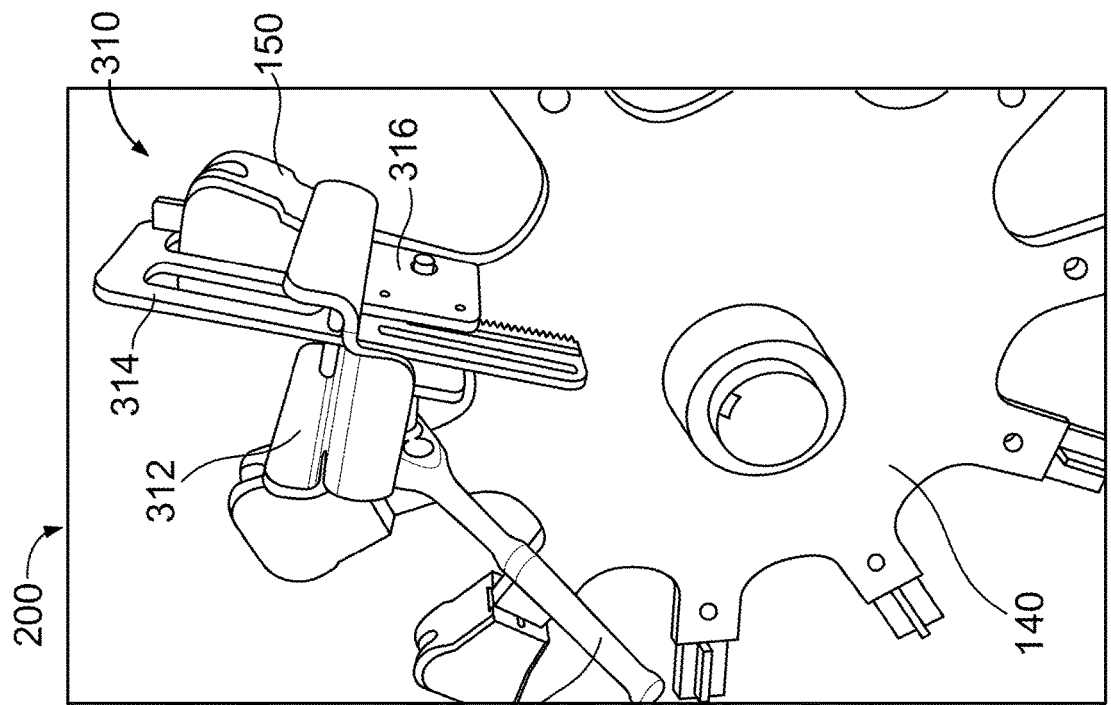
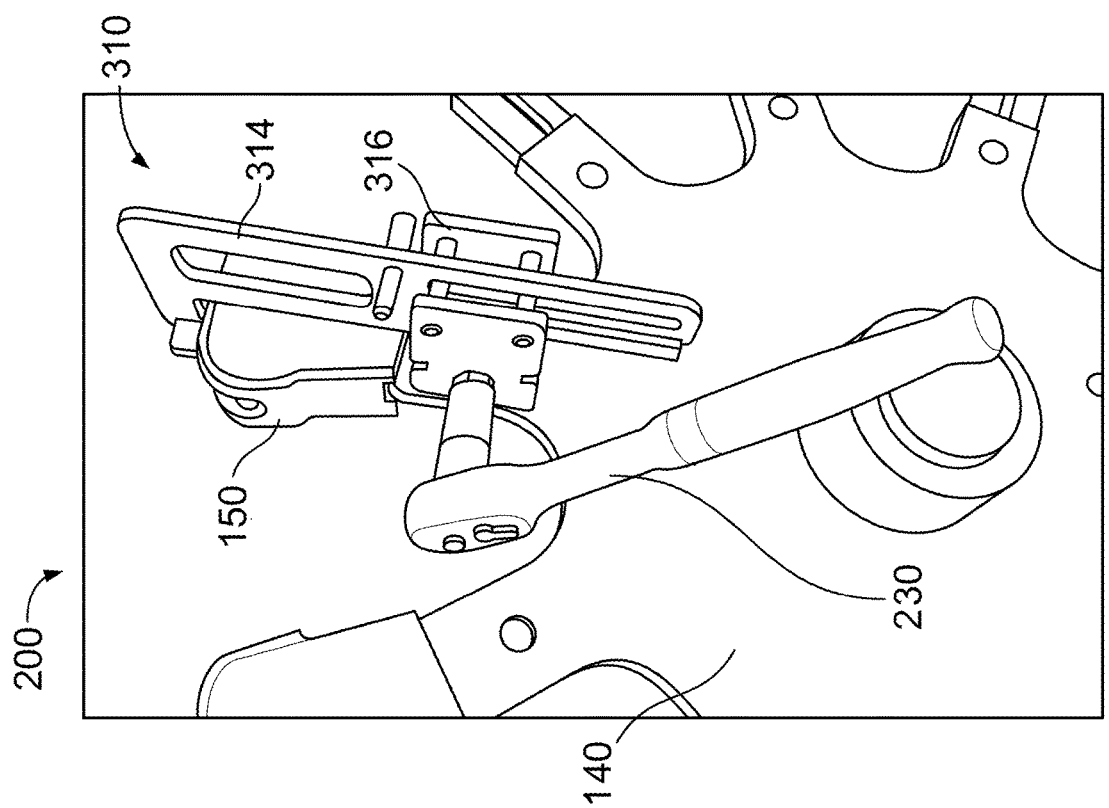
FIG. 8C
FIG. 8B

SPROCKET TOOTH CAP, SPROCKET ASSEMBLY, AND CONVEYOR SYSTEM

BACKGROUND

Sprockets are used to drive a variety of closed loop systems, such as a cable conveyor system, by transmitting rotary motion. Some sprockets include a set of teeth to drive a chain, belt, or conveyor of the closed loop system. Sprockets having teeth made of a metallic material can exacerbate wear and damage to some closed loop systems. The metal teeth can shorten the life of the system and pose health and safety concerns in certain industries, such as the food industry. Further, in sprockets having removable teeth, fastening hardware (e.g., bolts, nuts, and pins) can trap particles and pose contamination concerns in food grade systems. Replacing worn parts may require removal of the sprocket and/or fastening hardware which may increase cost and time associated with the use of closed loop systems.

OVERVIEW

In a first implementation, a conveyor system is provided. The conveyor system includes a conveyor having an endless loop flexible member and a plurality of inserts disposed on the endless loop flexible member. The conveyor system also includes a drive unit configured to rotate a drive shaft. The conveyor system additionally includes a sprocket coupled to the drive shaft, the sprocket drivingly engaged to the endless loop flexible member. The sprocket includes a hub coupled to the drive shaft and a plurality of teeth extending radially outward from the hub, where at least one tooth of the plurality of teeth is substantially planar and comprises a first end and a second end defining a channel. The sprocket also includes a plate disposed within the channel between the first and second end and fixedly coupled to the tooth. The conveyor system further includes a sprocket tooth cap fixedly coupled via an interference fit to the tooth and the plate. The sprocket tooth cap includes a body having a first end and a second end opposite the first end. The first end defines a channel and an engagement face configured to drivingly engage the endless loop flexible member. The second end defines a cavity, where the cavity defines at least one pair of opposite facing surfaces, and where the at least one pair of opposite facing surfaces is configured to form an interference fit with the at least one of the plurality of teeth.

In an embodiment of the conveyor system, the sprocket further includes a circular aperture radially disposed at distance between the tooth and the hub, wherein the circular aperture is aligned with a centerline of the tooth.

In an embodiment of the conveyor system, the sprocket tooth cap comprises a first material and the tooth comprises a second material different than the first material.

In an embodiment of the conveyor system, the sprocket tooth cap has a continuous outer surface.

In an embodiment of the conveyor system, the channel of the sprocket tooth cap engages the endless loop flexible member and the engagement face drivingly engages at least one insert of the plurality of inserts disposed on the endless loop flexible member.

In an embodiment of the conveyor system, the cavity of the sprocket tooth cap defines a first pair of opposite facing surfaces and a second pair of opposite facing surfaces disposed at an angle to the first pair of opposite facing surfaces, and where the first pair of opposite facing surfaces forms the interference fit with the sprocket tooth and the second pair of opposite facing surfaces forms an interference fit with the plate.

In such embodiments of the conveyor system, the angle is substantially 90 degrees.

In a second implementation a sprocket assembly is provided. The sprocket assembly includes a hub defining a bore. The sprocket assembly also includes a plurality of teeth extending radially outward from the hub, where at least one tooth of the plurality of teeth is substantially planar and comprises a first end and a second end defining a first channel. The sprocket assembly additionally includes a plate disposed within the first channel of the tooth. The sprocket assembly further includes a sprocket tooth cap fixedly coupled via an interference fit to the tooth and the plate. The sprocket tooth cap includes a body having a first end and a second end opposite the first end. The first end defines a second channel and an engagement face configured to drivingly engage a flexible member. The second end defines a cavity, where the cavity defines at least one pair of opposite facing surfaces, where the at least one pair of opposite facing surfaces is configured to form an interference fit with the at least one of the plurality of teeth.

In an embodiment of the sprocket assembly, the sprocket assembly further includes a circular aperture radially disposed at distance between the tooth and the hub, where the circular aperture is aligned with a centerline of the tooth.

In an embodiment of the sprocket assembly, the plate is disposed within the channel substantially perpendicular to the tooth.

In an embodiment of the sprocket assembly, the sprocket tooth cap comprises a first material and the tooth comprises a second material different than the first material.

In an embodiment of the sprocket assembly, the sprocket tooth cap has a continuous outer surface.

In an embodiment of the sprocket assembly, the cavity of the sprocket tooth cap defines a first pair of opposite facing surfaces and a second pair of opposite facing surfaces disposed at an angle to the first pair of opposite facing surfaces, and where the first pair of opposite facing surfaces forms the interference fit with the sprocket tooth and the second pair of opposite facing surfaces forms an interference fit with the plate.

In such embodiments of the sprocket assembly, the angle is substantially 90 degrees.

In a third implementation, a sprocket tooth cap for a sprocket assembly is provided. The sprocket tooth cap includes a body having a first end, and a second end opposite the first end. The sprocket tooth cap also includes the first end defining a channel and an engagement face configured to drivingly engage a flexible member. The sprocket tooth cap additionally includes the second end defining a cavity, where the cavity defines at least one pair of opposite facing surfaces, where the at least one pair of opposite facing surfaces is configured to form an interference fit with a sprocket tooth.

In an embodiment of the sprocket tooth cap, the at least one pair of opposite facing surfaces defined by the cavity comprises a first pair of opposite facing surfaces and a second pair of opposite facing surfaces, where the second pair of opposite facing surfaces is disposed at an angle from the first pair of opposite facing surfaces.

In such embodiments of the sprocket tooth cap, the angle is substantially 90 degrees.

In a fourth implementation, a method is provided. The method includes attaching a tool to a sprocket body, where the tool comprises a lever arm coupled to a head, and a shaft coupled to the head, where the shaft is inserted into an aperture on the sprocket body. The method also includes aligning the head with a sprocket tooth cap. The sprocket tooth cap including a body having a first end, and a second end opposite the first end; the first end defining a channel and an engagement face configured to drivingly engage a flexible member; the second end defining a cavity, where the cavity defines a pair of opposite facing surfaces, where the pair of opposite facing surfaces is configured to form an interference fit with a sprocket tooth. The method further includes actuating the lever arm to engage the head with the sprocket tooth cap, where engagement of the head during actuation causes linear movement in the sprocket tooth cap to urge the sprocket tooth cap radially outward with respect to the sprocket tooth. The method additionally includes removing the sprocket tooth cap from the sprocket tooth.

In an embodiment of the method, the method further includes pressing a second sprocket tooth cap onto the sprocket tooth, the second sprocket tooth cap forming an interference fit with the sprocket tooth.

Other embodiments will become apparent to those of ordinary skill in the art by reading the following detailed description, with reference where appropriate to the accompanying drawings.

BRIEF DESCRIPTION OF THE DRAWINGS

Example embodiments are described herein with reference to the drawings.

FIG. 4 shows a front view of the sprocket tooth cap of the conveyor system, according to an example embodiment.

FIG. 5 shows a front cross-sectional view of the sprocket tooth cap of the conveyor system, according to an example embodiment.

FIG. 8A is an exploded view of a head that may be used on an installation/removal tool, according to an example embodiment.

FIGS. 8B-8C show the installation/removal tool, including the head, as used on the sprocket, according to an example embodiment.

The drawings are schematic and not necessarily to scale. In the drawings, similar symbols typically identify similar components, unless context dictates otherwise.

DETAILED DESCRIPTION

This description describes several example embodiments, at least some which relate to conveyor systems. In example embodiments, the conveyor system includes a sprocket tooth cap that is coupled to a sprocket via an interference fit. The interference fit between the sprocket tooth cap and sprocket may be used instead of fastening hardware and may reduce cross-contamination of conveyed material, which may providing a more hygienic and sanitary processing of the conveyed material.

In examples of the present disclosure, a conveyor system includes an endless loop flexible member and a plurality of inserts disposed on the endless loop flexible member. The conveyor system also includes a drive unit configured to rotate a drive shaft and a sprocket coupled to the drive shaft, with the sprocket being drivingly engaged to the endless loop flexible member. The sprocket includes a hub coupled to the drive shaft and a plurality of teeth extending radially outward from the hub, where at least one tooth of the plurality of teeth is substantially planar and comprises a first end and a second end defining a channel. A plate is disposed within the channel between the first and second end and is fixedly coupled to the tooth. A sprocket tooth cap is fixedly coupled via an interference fit to the tooth and the plate. The sprocket tooth cap includes a body having a first end and a second end opposite of the first end. The first end defines a channel and an engagement face that is configured to drivingly engage the endless loop flexible member. The second end defines a cavity, where the cavity defines at least one pair of opposite facing surfaces. At least one pair of the opposite facing surfaces is configured to form an interference fit with the at least one of the plurality of teeth.

Figure 1:
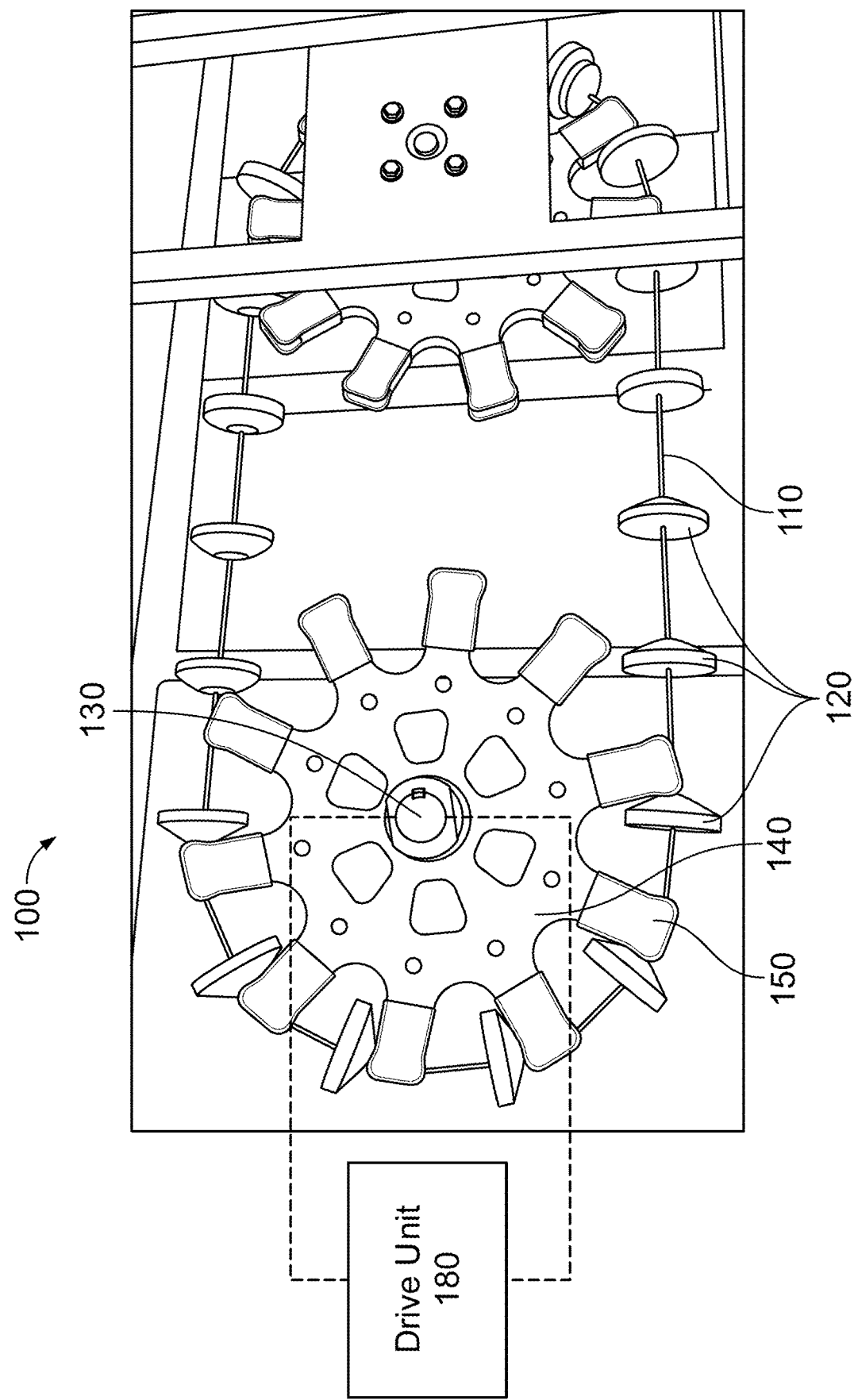
FIG. 1 illustrates a conveyor system, according to an example embodiment.

Now referring to the Figures, FIG. 1 illustrates aspects of a conveyor system 100 according to an example embodiment. The example conveyor system 100 includes a drive unit 180 having a drive shaft 130 that is coupled to a sprocket 140. The sprocket 140 of the conveyor system 100 is drivingly engaged, via a sprocket tooth cap 150 coupled to the sprocket 140, to a flexible member 110 having inserts 120 disposed along the flexible member 110. In operation of the conveyor system 100, the drive unit 180 turns the drive shaft 130 which rotates the sprocket 140. The sprocket tooth cap 150 is in communication with the flexible member 110 and inserts 120; rotation of the sprocket 140 causes the sprocket tooth cap 150 to drive the flexible member 110 and inserts 120 about a path. Driving engagement may be accomplished by compression forces (e.g., pushing) of the sprocket tooth cap 150 on the inserts 120 and tension forces of the sprocket tooth cap 150 on the flexible member 110. Thus, rotation of the sprocket 140 causes the sprocket tooth cap 150 to push the inserts 120 along the path at a speed at which the sprocket 140 is rotating, and tension of the sprocket tooth cap 150 on the flexible member 110 may serve to keep overall tension in the conveyor system 100 at a specified level.

In one example, the drive unit 180 is an electric motor that rotates the drive shaft 130. The drive shaft 130 may be coupled to the sprocket 140 (e.g., a drive sprocket), for instance at a hub of the sprocket 140, to allow the drive shaft 130 to rotate the sprocket 140. For instance, the drive shaft 130 may include a noncircular portion that engages with a noncircular aperture of the sprocket 140, while in other examples the drive shaft 130 may be welded to the sprocket 140, secured by pins, have mating teeth and grooves (e.g., male and female fittings with the respective parts), and/or use fasteners and nuts.

The flexible member 110 may be an endless loop flexible member having multiple inserts 120 disposed on the endless loop and in communication with two or more sprockets 140. For example, the conveyor system 100 may include a first sprocket (e.g., the drive sprocket) and a second sprocket (e.g., an idler sprocket). The flexible member 110 may form a loop or track around the multiple (e.g., the first and second) sprockets, as shown in the example of FIG. 1, and each sprocket 140 in the system may drivingly engage the flexible member 110 and/or the inserts 120. However, in some examples only one sprocket may drivingly engage the flexible member 110. The flexible member 110 may include a series of attachment points that allow for individual inserts 120 to be attached, removed, and/or replaced, or to add or remove extra sections to the flexible member 110. For example, some conveying applications may require lengthening the flexible member 110 and adding more inserts 120. Attachment points along the flexible member 110 may allow sections to be added as needed rather than replacing the entire flexible member 110. In another example, an insert 120 may need replaced due to damage or wear, attachment points would allow for replacement of the specific insert to be performed without removal of the entire flexible member 110. The attachment points may be located approximate to the position of the inserts 120, and may include any suitable coupling means, such as a fastener and a nut.

While the flexible member 110 shown in FIG. 1 is a metallic cable, other materials may also be used for the flexible member 110. For example, the flexible member 110 may be a chain, rope, or belt. The flexible member 110 may be made from any suitable material, such as metal, and may include a coating, such as a plastic coating, corrosions and/or erosion preventative coating, antimicrobial coating, and/or food grade material coating, depending on the desired conveying application.

Similarly, the inserts 120 may be made from any suitable material, such as a plastic, a metal, or a combination of plastic and metal, depending on the desired conveying application and requirements of processing. For example, a food grade plastic may be required or desirable as a material for inserts 120 used in the food processing industry while metal may be acceptable for processing waste or bi-products. The inserts 120 may be disposed at equal spacing along the flexible member 110, however other spacing arrangements are also contemplated. In some conveying applications, the inserts 120 may be sized to fit within a tube, as used in a tubular conveyor system.

In some examples, the conveyor system 100 is a tubular drag conveyor system, while in other examples the conveyor system 100 is a cable conveyor system. In examples where the conveyor system 100 is the tubular drag conveyor system, the inserts 120 may be a disc having a diameter less than a diameter of a tube of the tubular drag conveyor system. The conveyor system 100 may be used to convey particulate material, including granular and powdery substances, for example.

Figure 2:
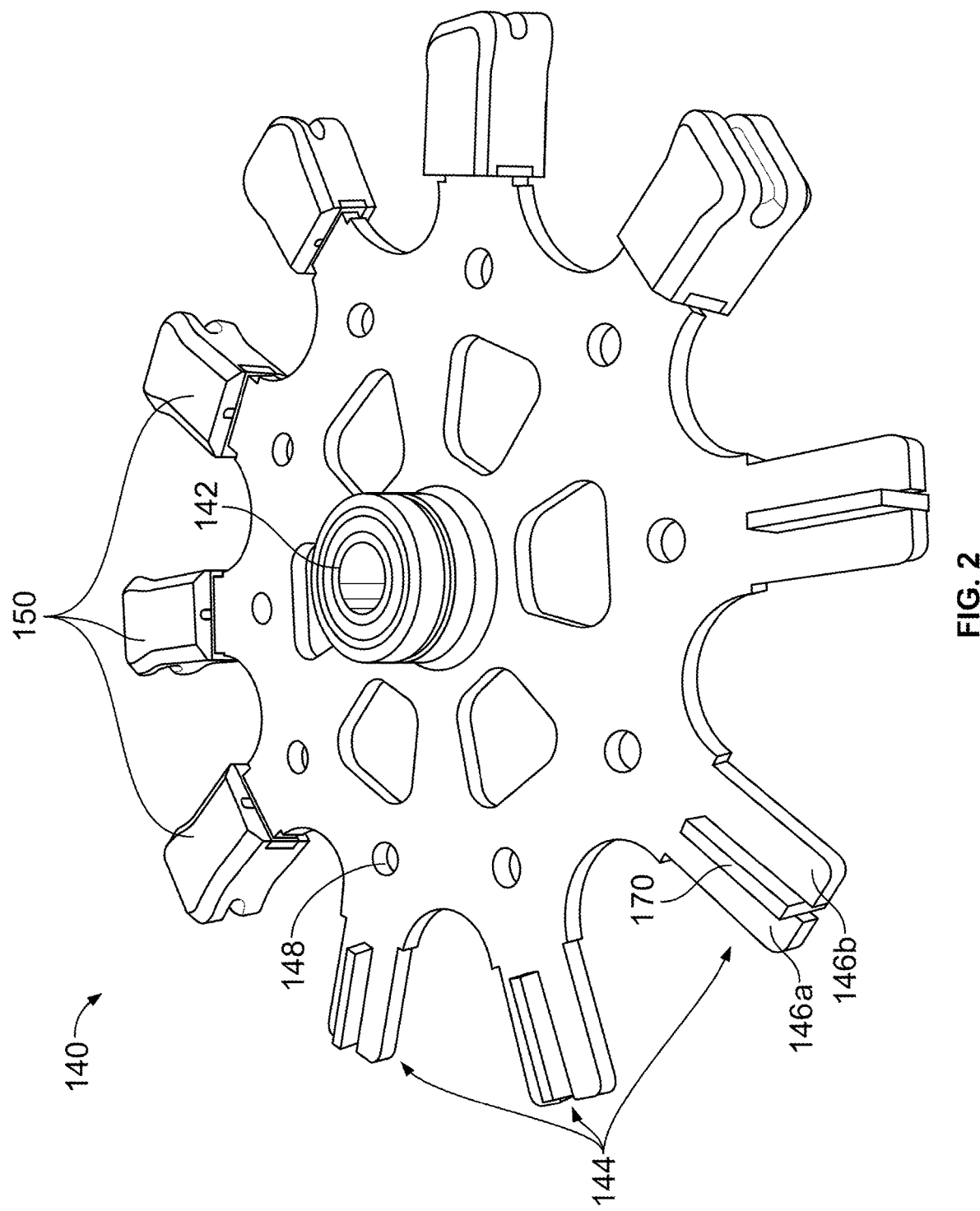
FIG. 2 illustrates the sprocket of the conveyor system, according to an example embodiment.

FIG. 2 illustrates the sprocket 140 of the conveyor system 100 according to an example embodiment. The sprocket 140 includes a hub 142 that defines a bore, a circular aperture 148, and a plurality of teeth 144 that extend radially outward from the hub 140. Each tooth 144 is substantially planar and has a first end of the tooth 146a and a second end of the tooth 146b that defines a channel lying between the first and second end. The sprocket 140 further includes a plate 170 coupled to the tooth 144 disposed within the channel formed by the first end of the tooth 146a and second end of the tooth 146b. While only some of the teeth 144 shown in FIG. 2 are covered by the sprocket tooth cap 150, this is for illustrative purposes only and in practice any number of the teeth 144, for example all of the teeth 144, may be covered by a corresponding sprocket tooth cap 150. Further, the sprocket 140 may include any number of teeth 144. Each tooth 144 may define any number of channels, with each channel including the insert 170 disposed within the channel and coupled to the tooth 144. For example, the sprocket 140 may include ten teeth 144, with each tooth 144 defining a channel having the insert 170 disposed within the channel and coupled to the respective tooth 144.

The teeth 144 may be integral with the sprocket 140 and formed as a single piece construction from same material. The sprocket 140, including the teeth 144, may be made from any suitable material such as a plastic or a metal. For example, the sprocket 140, including the sprocket teeth 144, may be formed from a single piece of sheet metal, such as steel. Using steel for the sprocket 140 and teeth 144 material provides beneficial structural properties and may prolong the life of the sprocket 140. However, metal (e.g., steel) contact may increase the wear on, and shorten the service life of, the flexible member 110. Additionally, industry specific regulations, such as the food processing industry, may prohibit the use of metal on parts that contact food. Therefore, while the sprocket 140 may be made from any suitable material, in some examples a separate material may be desirable for the sprocket tooth cap 150.

In one example, the sprocket tooth cap 150 is made from a first material and the teeth 144 are made from a second material different than the first material. For instance, the sprocket tooth cap 150 may be made from plastic, while the teeth 144, and similarly the sprocket 140, are made from metal, such as stainless steel. The use of plastic material for the sprocket tooth cap 150 may result in reduced wear on the flexible member 110 and inserts 120, thus prolonging the life of the system. For food grade conveying applications, the sprocket tooth cap 150 may be a Food & Drug Administration (FDA) compliant plastic and/or nylon, as the sprocket tooth cap 150 comes into contact with the flexible member 110 and inserts 120, described in FIG. 1, which may be used to convey food products. Some examples of plastics for the sprocket tooth cap 150 include high-density polyethylene (HDPE), low-density polyethylene (LDPE), polycarbonate (PC), polyethylene terephthalate (PET), polypropylene (PP), and other plastics now known or later discovered to be suitable by the FDA, or similar entity, for use. For Food Grade conveying applications, prior sprocket designs may be a single piece made of FDA approved material. However, it may be costly to make a single piece sprocket of FDA approved material and/or time consuming and costly to replace such a sprocket in the field. Further, continuing to use such a sprocket after it has worn may rapidly destroy the flexible member and inserts. Thus, the use of an FDA approved food grade plastic material for the sprocket tooth cap 150 may reduce replacement costs by allowing for a worn sprocket tooth cap 150 to be replaced without replacing the entire sprocket 140. This may allow for more frequent replacement of the sprocket tooth cap 150 when worn, which may reduce wear on the flexible member 110 and the inserts 120. Further, in some examples replacement of the sprocket tooth cap 150 may be accomplished without disassembling the conveyor system 100, which may reduce downtime of the conveyor system 100 due to maintenance.

As previously stated, the sprocket 140 includes a plate 170 coupled to the tooth 144 lying within the channel formed by the first end of the tooth 146a and second end of the tooth 146b. The channel may be disposed at a midpoint on the tooth 144 such that the first end of the tooth 146a and the second end of the tooth 146b are symmetrical. The width of the channel may be sized according to the thickness of the plate 170 installed. For instance, if the plate 170 is manufactured to have a thickness "t" the width of the channel may be substantially equal to thickness "t". Alternatively, the thickness of the plate 170 may be sized to be substantially equal to the width of the channel. The plate 170 may be coupled to the tooth 144 using any suitable means, for example welding. The plate 170 may be made from any suitable material, and may be the same material (e.g., steel) as the sprocket 140. Further the plate 170 may be disposed at an angle within the channel.

In one example the plate 170 is disposed within the channel substantially perpendicular to the tooth 144. In this example, the plate is disposed at around a ninety degree angle to the tooth 144, so that the plate and the tooth 144 form a right angle. However, other angles are also contemplated. The plate 170 may form an angle to the tooth 144 anywhere between zero and ninety degrees. For example, the plate 170 may form an angle to the tooth 144 between at least 80-90 degrees, between at least 70-80 degrees, between at least 60-70 degrees, between at least 50-60 degrees, between at least 40-50 degrees, between at least 30-40 degrees, between at least 20-30 degrees, between at least 10-20 degrees, and between at least 0-10 degrees. The plate 170 may be disposed symmetrically within the channel of the tooth 144 such that plate material extending on one side of the tooth 144 is the same as plate material extending on another side of the tooth 144. The plate 170 may provide added structural rigidity and support to the sprocket tooth cap 150 during operation of the conveyor system 100 as the sprocket tooth cap 150 engages with the flexible member 110 and inserts 120. Forces generated from the sprocket tooth cap 150 pushing against the inserts 120 may be transferred to the plate 170 which may then transfer the forces into the sprocket 140. While the sprocket 140 shown in FIG. 2 includes a single plate 170 lying within each tooth 144, other embodiments may have multiple plates lying within a single tooth 144, or not include a plate at all.

In one example, the sprocket 140 defines at least one circular aperture 148 radially disposed at a distance between the hub 142 and at least one tooth 144 and is aligned with a centerline of the tooth 144. The centerline may be a line that extends radially outward from the hub 142 and intersects with a midpoint of the respective tooth 144. In another example, the sprocket 140 may define circular apertures 148 located between each respective tooth 144 and the hub 142 so that each tooth 144 has a corresponding circular aperture 148. However, in other examples the circular aperture 148 may not be aligned with a centerline of the tooth 144, and may be off-center or disposed between two adjacent teeth 144. The circular aperture 148 may couple to an installation/removal tool used to install and/or uninstall the sprocket tooth cap 150 from the sprocket 140.

Figure 3A:
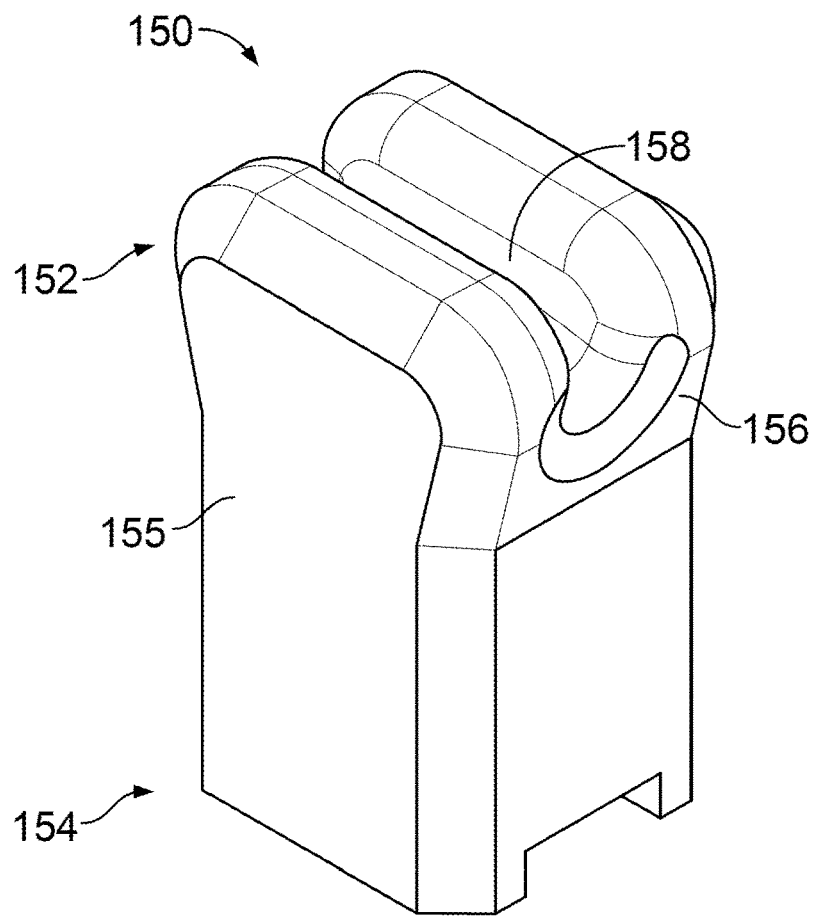
FIG. 3A is a perspective view of the sprocket tooth cap of the conveyor system, according to an example embodiment.
Figure 3B:
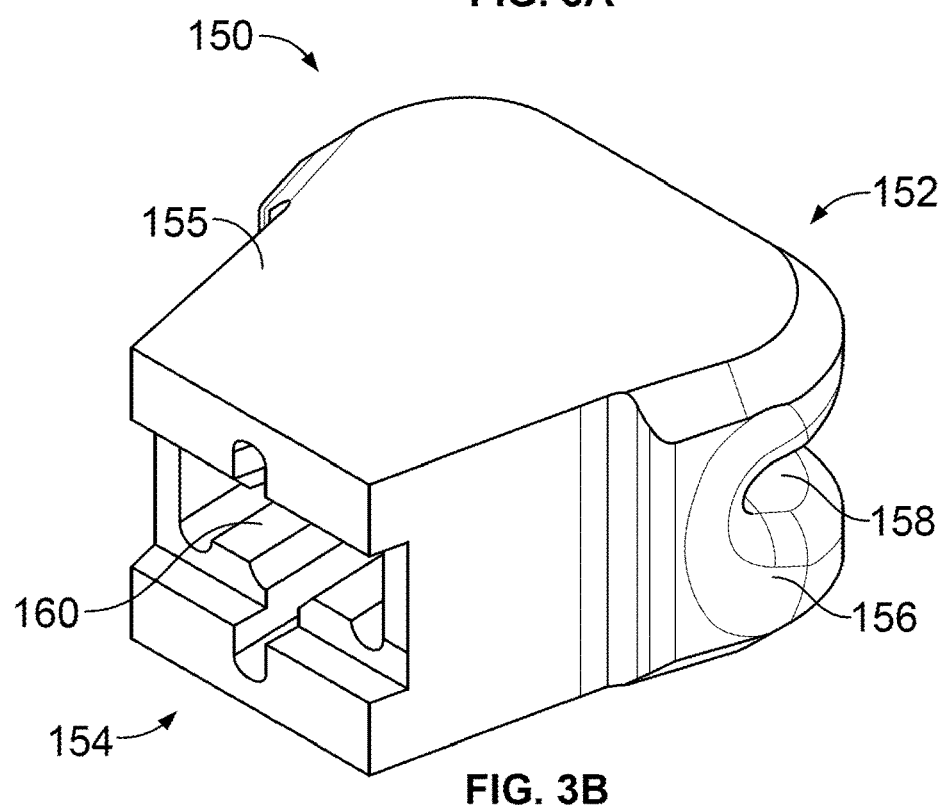
FIG. 3B is a perspective view of the sprocket tooth cap of the conveyor system, according to an example embodiment.

FIG. 3A and FIG. 3B are perspective views of the sprocket tooth cap 150 of the conveyor system 100 according to an example embodiment. A body of the sprocket tooth cap 150 includes an outer surface 155, a first end 152, and a second end 154. The first end 152 of the sprocket tooth cap 150 defines a channel 158 configured to engage with the flexible member 110, and at least one engagement face 156 that engages with at least one of the inserts 120. The second end, shown in FIG. 3B includes a cavity 160. In some embodiments, the sprocket tooth cap 150 may be installed on a mechanical corner. The mechanical corner may be a fixed position turnaround.

The first end 152 of the sprocket tooth cap 150 defines the channel 158. The channel 158 may be disposed along a midline of the first end 152 such that when the sprocket tooth cap 150 is coupled to the respective tooth 144 the channel 158 is oriented substantially parallel to the tooth 144. When the channel 158 is oriented substantially parallel to the tooth 144, the material on either side of the channel 158 may be symmetric, having substantially the same thickness on either side at any given cross-section. The channel 158 may be tapered (e.g., a modified V-shape) to be wider towards the end furthest away from the second end 154 and narrowest at the end closest to the second end 154, or the channel 158 may be uniform (e.g., a modified U-shape) and have substantially the same width throughout. In embodiments where the channel width is tapered, the taper may serve to better capture and guide the flexible member 110 into the channel 158. The ideal width of the channel 158 may be determined by the flexible member 110 used. For example, if the flexible member 110 is a coated steel cable with a total cross-sectional thickness of 0.25 inches, the narrowest width of the channel 158 may be sized to fit the 0.25 inch cross-sectional thickness of the cable. Other dimensions are also contemplated. For instance, the flexible member 110 may have a total cross-sectional thickness of $3/16$ inches, $7/32$ inches, $5/16$ inches, or $3/8$ inches. Having the channel 158 width appropriately sized to the dimensions of the flexible member 110 may help in retaining and securing the flexible member 110 during operation of the conveyor system 100. This may help to reduce vibration in the conveyor system 100. Thus, the width and dimensions of the channel 158 may be sized to accommodate the needs of the flexible member 110.

The engagement face 156 is located at the first end 152 of the sprocket tooth cap 150 and may be configured to drivingly engage the flexible member 110 and/or the inserts 120. For example, the engagement face 156 may engage with the inserts 120, such as by pushing, as the sprocket 140 is rotated by the drive shaft 130. The engagement face 156 pushing against the inserts 120 causes the flexible member 110 and inserts 120 to move about the path during operation of the conveyor system 100. While pushing is used to describe the force exerted by the engagement face 156 against the inserts 120, in conveyor systems employing more than one sprocket 140, the action may also be viewed as the engagement face 156 pulling the flexible member 110 along the path.

The engagement face 156 may be located in line with the channel 158. The engagement face 156 shown in the example embodiments of FIGS. 3A and 3B has a radiused geometry. In some examples, the engagement face 156 may have a concave geometry. And in further examples, the engagement face 156 may be radiused and concave in geometry. The inserts 120, described in FIG. 1, may be substantially flat on a front side and have a conical or cylindrical shape on a back side. Thus, the radiused and/or concave geometry of the engagement face 156 may provide a better fitting to the conical or cylindrical backing of the insert 120, and may be configured to partially receive a portion of the insert 120. This may not only provide a more secure contact between the insert 120 and the engagement face 156, but may better distribute loading throughout the engagement face 156 as point loads are minimized. The more even distribution of loading may reduce wear, as well as, premature cracking of the engagement face 156 due to minimizing point loads and fatigue stresses. While the engagement face 156 shown in FIGS. 3A and 3B is radiused, other geometries, such as a planar (e.g., flat or substantially flat) engagement face 156, are also contemplated. The geometry of the engagement face 156 may depend on the geometry of a surface on the insert 120 that the engagement face 156 contacts. Thus, the geometry of the engagement face 156 may be complimentary to the contact surface of the insert 120.

For example, a flat engagement face 156 may be included when the insert 120 has a flat contact surface, while a concave and/or radiused engagement face 156 may be included when the insert 120 has a convex and/or radiused contact surface (e.g., conical or cylindrical). Further, the engagement face 156 may have more material present (e.g., thicker), than other sections of the sprocket tooth cap 150, which may provide more wear resistance, and thus a longer run time of the conveyor system, before replacement.

While FIGS. 3A and 3B show only one engagement face 156, the sprocket tooth cap 150 may have more than one engagement face 156. For example, the sprocket tooth cap 150 may have the engagement face 156 on opposite sides of the first end 152, such as on opposite ends on the channel 158. When one of the engagement faces 156 is worn through use, the sprocket tooth cap 150 may be rotated so the second, un-worn, engagement face 156 may be used to engage the inserts 120. Having multiple engagement faces on a single sprocket tooth cap 150 may prolong the life of the sprocket tooth cap 150 before replacement is required.

The outer surface 155 of the sprocket tooth cap 150 includes all parts of the sprocket tooth cap that are not the cavity 160. The outer surface 155 may be the surface that is visible when the sprocket tooth cap 150 is installed on the teeth 144 of sprocket 140. In one example, the outer surface 155 of the sprocket tooth cap 150 is a continuous outer surface. The continuous surface may be a single unbroken design that is uninterrupted by apertures. The continuous outer surface may be free of apertures (e.g., fastener holes) and may be made using a single piece construction. In the food processing industry, fastener holes may allow material to become trapped, posing cross-contamination and health and safety concerns. Using the sprocket tooth cap 150 having the outer surface 155 being continuous, thus no fastener holes and/or other apertures, may reduce or prevent cross-contamination concerns and provide an overall more hygienic processing of the conveyed material.

In some instances, the sprocket tooth cap 150 may be made from more than one material. For example, a harder material may be used to make portions of the first end 152 while a softer (e.g., more flexible) material may be used to make portions of the remaining structure. Utilizing more than one material may allow for favorable material properties to be selected for specific aspects of the sprocket tooth cap 150. For example, a harder material chosen for the engagement face 156 may provide better wear resistance while a softer more flexible material for the second end 154 may allow for easier installation.

In other examples, different colored materials may be used on the various parts of the sprocket tooth cap 150. For example, more than one color material may be used on the engagement face 156. A first color may be present on a visible surface of the engagement face 156 while a second color may be present on a sub-surface of the engagement face 156 and serve as a visual wear indicator that replacement of the sprocket tooth cap 150 is necessary.

FIG. 4 shows a front view of the sprocket tooth cap 150 of the conveyor system 100 according to an example embodiment. As shown, the first end 152 is opposite the second end 154, with the first end 152 including the engagement face 156 and defining the channel 158. Further as shown, the example engagement face 156 is radiused, concave, and tapered in geometry, starting broadest at an outermost surface and narrowest away from the outermost surface. The engagement face 156 may be disposed in-line (e.g., centrally located) with the channel 158. As previously described, the width of the channel 158 may be tapered so that the channel 158 is wider at a point furthest away from the second end 154 and narrowest at a point closest to the second end 154.

FIG. 5 shows a front cross-sectional view of the sprocket tooth cap 150 of the conveyor system 100 according to an example embodiment. The cross-sectional view shows the outer surface 155 and the cavity 160. The cavity 160, as seen in the example of FIG. 5, may extend a distance from the second end 154 towards the first end 152. The cavity 160 may provide coupling of the sprocket tooth cap 150, having the continuous outer surface 155, to at least the tooth 144 of sprocket 140, and will be explained in more detail below.

Figure 6:
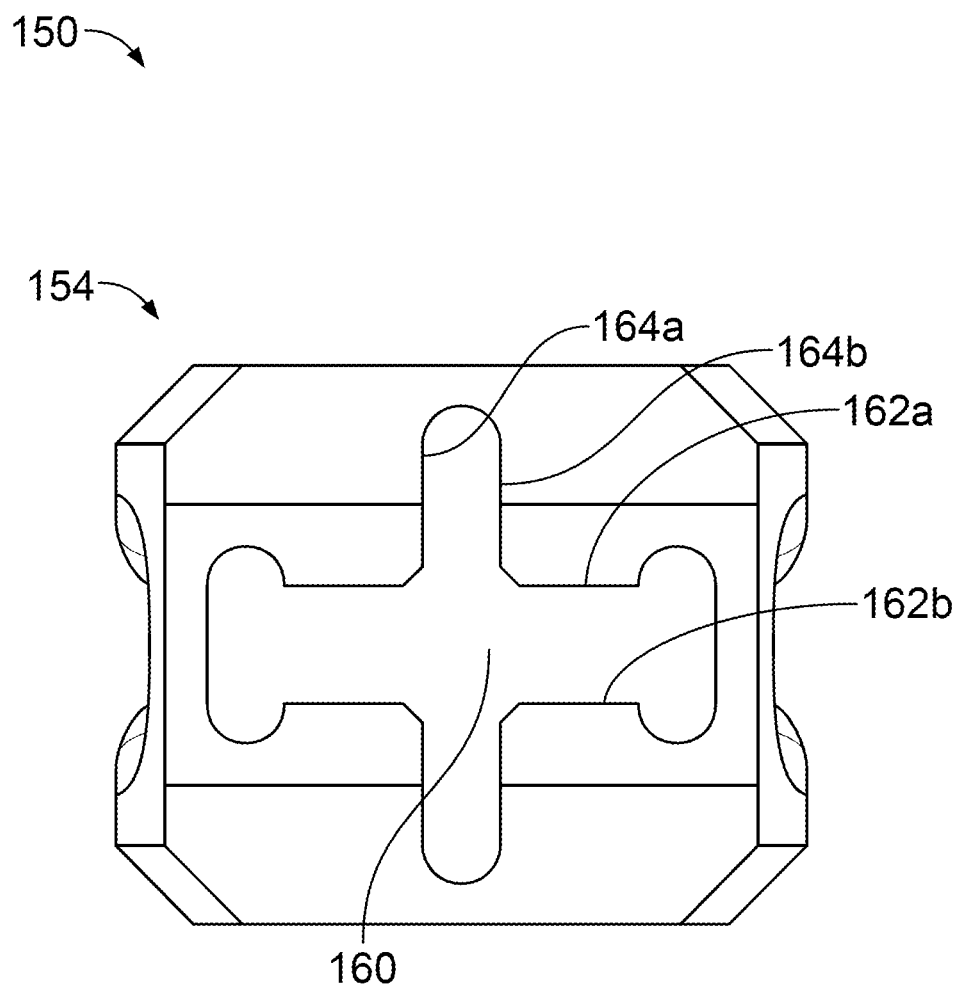
FIG. 6 is a bottom view showing the second end of the sprocket tooth cap of the conveyor system, according to an example embodiment.

FIG. 6 is a bottom view showing the second end 154 of the sprocket tooth cap 150 of the conveyor system 100 according to an example embodiment. The second end 154 defines the cavity 160 which is further defined by a first pair of opposite facing surfaces 162a and 162b and a second pair of opposite facing surfaces 164a and 164b. The cavity 160 may extend a distance toward the first end 152 so that a portion of the internal body of the sprocket tooth cap 150 is hollow (e.g., void of material). A perimeter may be defined by the material of the sprocket tooth cap 150 that defines the cavity 160, and may include the aforementioned opposite facing surfaces. The perimeter of the cavity may be radiused and/or rounded to match the geometry of a mating structure, such as accommodating a flange on the tooth 144. Further, the rounding and/or radius of the perimeter may serve to remove sharp edges where stresses from loading concentrate, and thus mitigate cracks from prematurely forming in the sprocket tooth cap 150. However, in other examples the perimeter may not be rounded and/or have a radius.

The sprocket tooth cap 150 may couple to the tooth 144 of the sprocket 140 by way of the cavity 160 receiving the tooth 144. In some examples, a gasket may be coupled to the second end 154 of the sprocket tooth cap 150. The cavity 160 may be configured to accept the gasket. For example, the cavity 160 may include a recessed portion matching a dimension of the gasket to allow the gasket to be at least partially recessed within the cavity 160. The gasket may form a seal between the sprocket tooth cap 150 and the tooth 144, which may mitigate the entrapment of material within the cavity 160, reducing the occurrence of cross-contamination. The sprocket tooth cap 150 may be fitted onto the tooth 144 so that a portion of the tooth 144 resides within the cavity 160. In one example, at least one pair of opposite facing surfaces, such as the first pair of opposite facing surfaces 162a and 162b, are configured to form an interference fit with at least one of the plurality of teeth 144. To form the interference fit, a distance between the first pair of opposite facing surfaces 162a and 162b may be less than a thickness of the tooth 144. For instance, if the tooth 144 has a thickness "x", the distance between the first pair of opposite facing surfaces 162a and 162b may be a distance smaller than (e.g., less than) "x" to form the interference. The interference fit may serve to fixedly couple the sprocket tooth cap 150 to the tooth 144 of the sprocket 140 eliminating the need for additional fastening hardware, such as fasteners and nuts. During replacement, the fastening hardware, such as fasteners and nuts, can drop into the conveyor system and pose a safety hazard when operating the conveyor system. Further, fastening hardware may trap material being conveyed, creating cross-contamination concerns. Because additional fastening hardware may be eliminated by using the interference fit coupling, the interference fit coupling may thus reduce or prevent cross-contamination concerns and provide an overall more hygienic and safe processing of the conveyed material in certain industries, such as the food processing industry. Moreover, the additional fastening hardware, such as nuts and bolts, may be time consuming to attach and detach resulting in increased downtime of the conveyor system, and thus increased downtime cost. Additionally, the sprocket tooth cap 150 may allow for installation and/or removal without the need for removing the sprocket 140. Thus, the interference fit coupling of the sprocket tooth cap 150 may reduce the downtime cost associated with maintenance.

Example interference fits described herein may include press fit (e.g., friction fit), force fit, and/or shrink fit. For example, a shrink fit may be performed by heating the sprocket tooth cap 150 to a specified temperature in order to expand the material, and then installing the heated sprocket tooth cap 150 onto the tooth 144. As the sprocket tooth cap 150 cools to ambient room temperature, the material contracts (e.g., shrinks) and forms an interference fit with the tooth 144. In another example, the sprocket tooth cap 150 may form the interference fit with the tooth 144 via a press fit. Press fitting may be accomplished by a user pressing the sprocket tooth cap 150 onto the tooth 144. Tools, such as a mallet, may also be used to accomplish the press fit.

Further, the level of interference and/or the interference fit style described above may be dependent on the material chosen for the sprocket tooth cap 150. Alternatively, the material chosen for the sprocket tooth cap 150 may depend, at least partially, on the level of interference desired and/or the interference fit style used. For example, in some instances it may be desirable to choose a material exhibiting at least some flexibility for the sprocket tooth cap 150 in order to press onto the tooth 144 and/or to avoid cracking during installation. Further, the material chosen for the sprocket tooth cap 150 may be chosen based on a favorable coefficient of friction, to aid in gripping the tooth 144 once installed. Other factors are also considered.

In another example, the cavity 160 includes the first pair of opposite facing surfaces 162a and 162b and the second pair of opposite facing surfaces 164a and 164b disposed at an angle to the first pair of opposite facing surfaces 162a and 162b, where the first pair of opposite facing surfaces 162a and 162b forms the interference fit with the tooth 144 and the second pair of opposite facing surfaces 164a and 164b forms an interference fit with the plate 170. The interference fit between the second pair of opposite facing surfaces 164a and 164b and the plate 170 is accomplished in a similar manner as described with respect to the first pair of opposite facing surfaces 162a and 162b and the tooth 144. To form the interference fit, a distance between the second pair of opposite facing surfaces 164a and 164b may be less than a thickness of the plate 170. The sprocket tooth cap 150 fixedly coupled to the sprocket 140 via interference fit with both the tooth 144 and the plate 170 may provide a more secure coupling than an interference fit with only one pair of opposite facing surfaces. Further, the interference fit with the plate 170 may help to more effectively transfer loading from the sprocket tooth cap 150 to the plate 170.

While only two pairs of opposite facing surfaces are shown in FIG. 6, the cavity may have any number of pairs of opposite facing surfaces, and the number of pairs of opposite facing surfaces may mirror the geometry of the mating parts. For example, if two plates 170 are installed on the tooth 144, the cavity 160 may have three pairs of opposite facing surfaces. Similarly, if no plate 170 is installed in the tooth 144, the cavity 160 may only have one pair of opposite facing surfaces. In one example, each pair of opposite facing surfaces may form an interference fit with the mating structure, while in other examples only some pairs or a single pair of opposite facing surfaces may form the interference fit with the mating structure.

The first pair of opposite facing surfaces 162a and 162b may be disposed at an angle to the second pair of opposite facing surfaces 164a and 164b. For example, the second pair of opposite facing surfaces 164a and 164b may be oriented at a substantially ninety degree angle to the first pair of opposite facing surfaces 162a and 162b. In this way the opposite facing surfaces may be perpendicular to one another. In the example where three pairs of opposite facing surfaces are present, two of the pairs of opposite facing surfaces may be parallel to one another and substantially perpendicular to the third pair of opposite facing surfaces, or all three pairs of opposite facing surfaces may form an acute angle with an adjacent pair of opposite facing surfaces.

Additionally, the first pair 162a and 162b and second pair 164a and 164b of opposite facing surfaces may intersect at a midpoint so that the cavity 160 is symmetric about the midpoint. In one example, the midpoint may be at a center of a cross-section of the cavity 160. Having a symmetric cavity design may allow the sprocket tooth cap 150 to be rotated during use, for example when the engagement face on one side is worn, so that the unworn engagement face may then be used to drive the conveyor. Thus, a symmetric cavity design may extend the time between replacement of the sprocket tooth cap 150. The angle at which the opposite facing surfaces are oriented may mirror the mating structure, such as the angle between the plate 170 and the tooth 144.

FIGS. 7A-7D show an installation/removal tool 200, according to an example embodiment. FIGS. 7A-7D illustrate the installation/removal tool 200 as used on the sprocket 140 for removing the sprocket tooth cap 150 from the sprocket 140. The example installation/removal tool 200 includes a head 210 coupled to a shaft 220 that is further coupled to a lever arm 230.

Figure 7B:
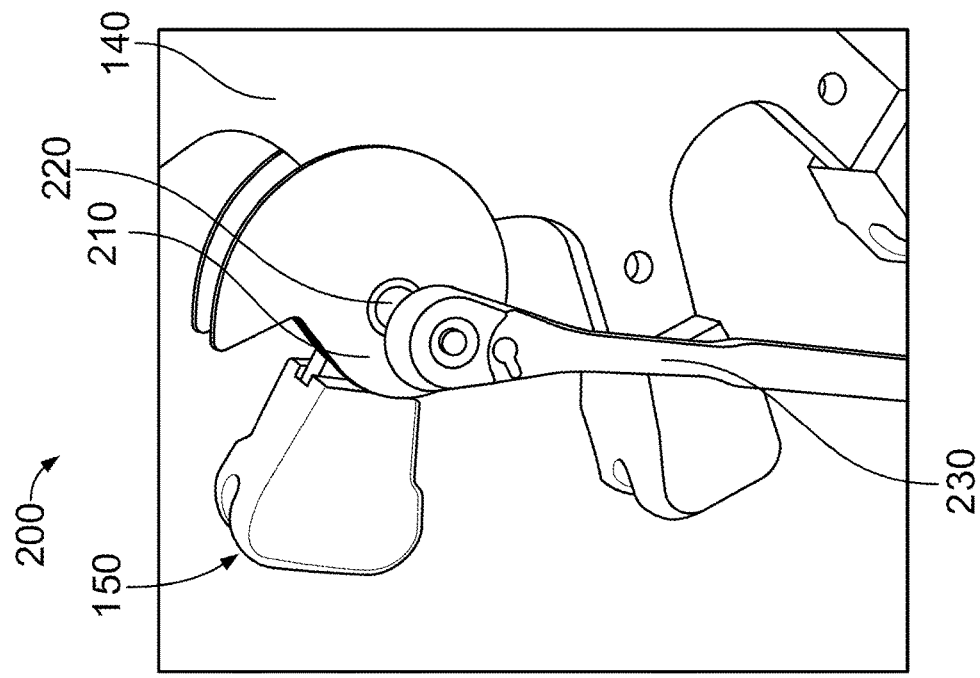
FIGS. 7A-7D show an installation/removal tool, according to an example embodiment.
Figure 7A:
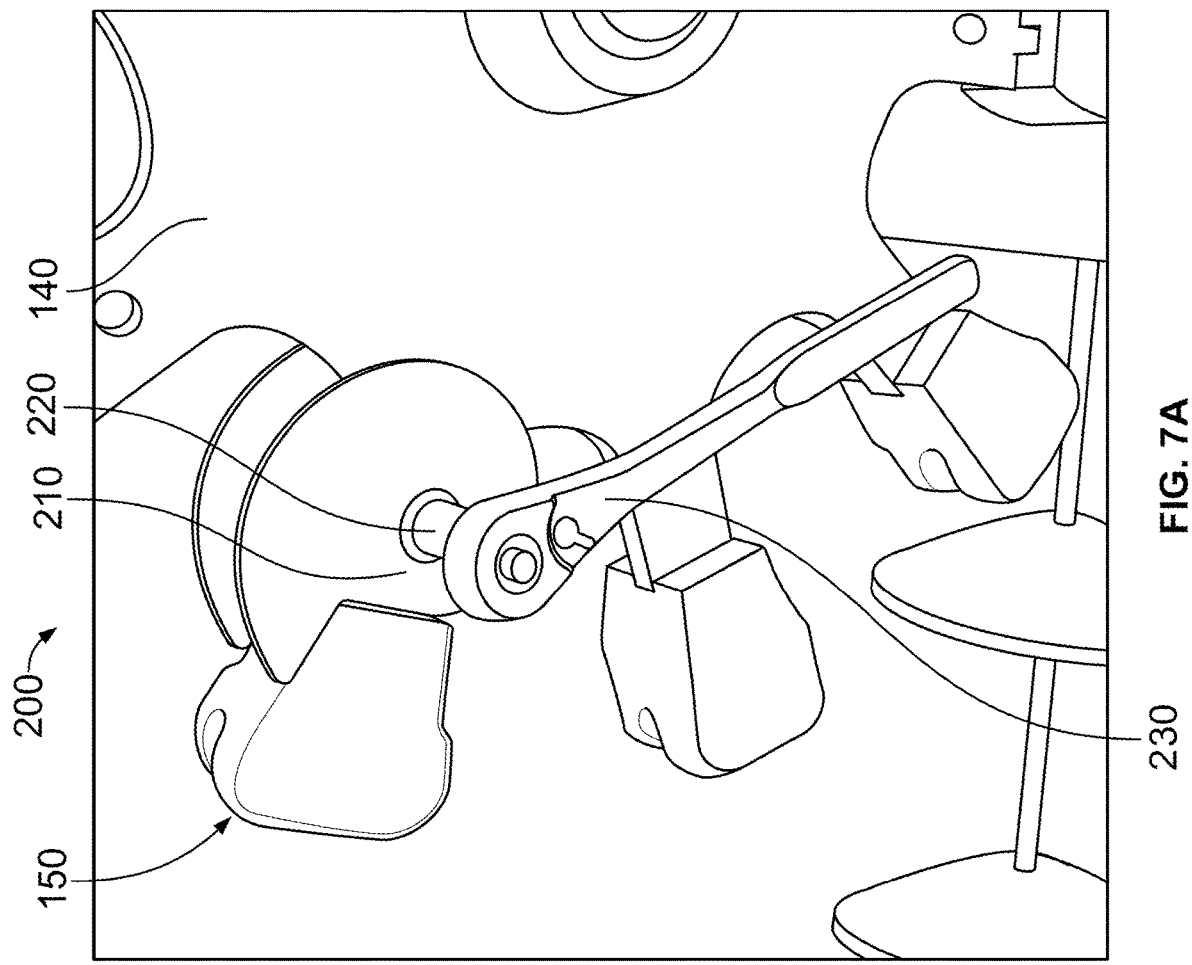
Figure 7D:
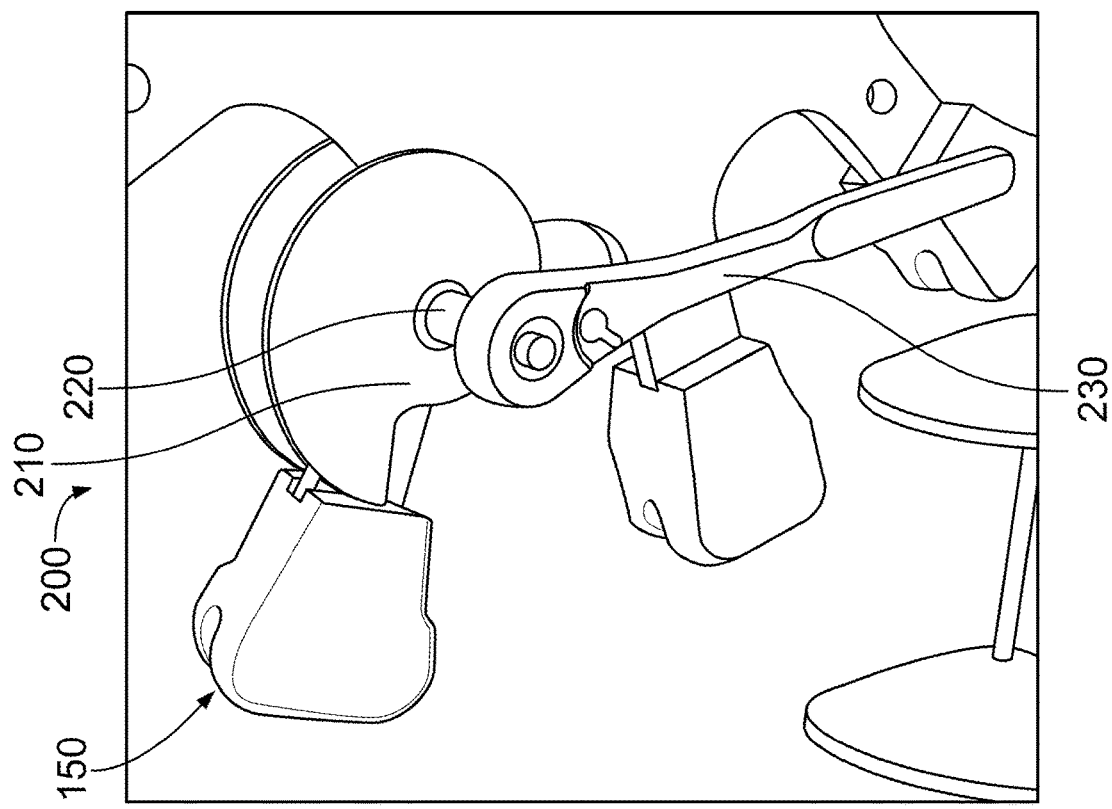
Figure 7C:
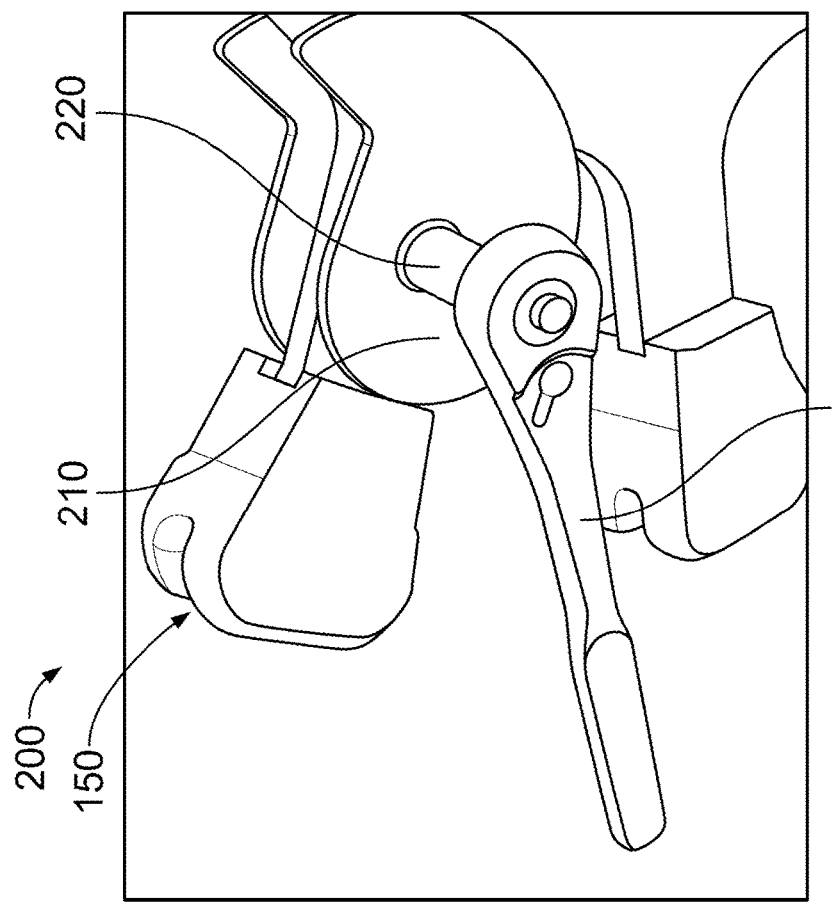

During operation of the installation/removal tool 200, the shaft 220 may removably couple to an aperture of the sprocket 140, such as aperture 148 shown in FIG. 2. The aperture may serve as an anchoring (e.g., fulcrum) point for the installation/removal tool 200 and may further properly align the head 210 with the sprocket tooth cap 150. As can be seen in FIG. 7A, the head 210 is aligned with the sprocket tooth cap 150.

The head 210 of the installation/removal tool 200 may be arcuate in geometry, having a portion of a perimeter exhibiting a curved profile. The head 210 may further include a portion that aligns with a profile of the sprocket tooth cap 150. For example, a portion of the head may include a substantially flat surface that forms an obtuse angle with another substantially flat portion, where the angle mirrors an angle present on the sprocket tooth cap 150. This may allow a user to verify that the installation/removal tool 200 is properly aligned with the sprocket tooth cap. In some examples the head 210 is formed from two symmetrical pieces that couple via the shaft 220. However, in other examples only one piece forms the head 210. The two symmetrical pieces forming the head 210 may be disposed at a distance from one another along the shaft 220. In one example, the shaft is eccentrically located on the head 210.

During operation of the installation/removal tool 200, the user may place the first symmetrical piece of the head 210 on a face of the sprocket 140 and place the second symmetrical piece of the head 210 on an opposite face of the sprocket 140. The shaft 220 may then couple the two pieces of the head 210 via aperture 148 such that each piece of the head 210 is situated on opposite faces of the sprocket 140. Coupling between the shaft 220 and the head 210 may be accomplished using any suitable means. The head 210 may further couple to the lever arm 230. In one example, the lever arm 230 is a ratchet that couples to a portion of the shaft 220 protruding outwardly from the head 210. In another example, the shaft 220 includes a first shaft coupled to a surface of the first symmetrical piece of the head 210, where the first shaft further couples to the lever arm 230, and a second shaft coupled to an opposite surface of the first symmetrical piece of the head 220, where the second shaft further couples to the second symmetrical piece of the head 220. In further examples, the lever arm 230 couples via a socket to a hex bolt head that is fixedly coupled to the head 210. Other methods of coupling the lever arm 230 to the head 210 are possible. The user may use the lever arm 230 to operate the installation/removal tool 200, which will be detailed below.

FIGS. 7A-7D show various stages of the installation/removal tool 200 during a removal process for the sprocket tooth cap 150. As illustrated, the lever arm 230 may be rotated in a clockwise or counterclockwise direction to actuate the head 210. In this instance the lever arm 230 is rotated clockwise. Rotation of the lever arm 230 causes the shaft 220 to rotate the head 210. The shaft 220 may be eccentrically located on the head 210, such that the distance between the shaft 220 and an edge of the head 210 is not equal. In this way, the head 210 may serve as a cam. During operation of the installation/removal tool 200, as the head 210 is rotated the head 210 continually engages with the sprocket tooth cap 150 to gradually urge the sprocket tooth cap 150 radially outward from the sprocket 140.

After the sprocket tooth cap 150 has been removed and/or sufficiently loosened, the installation/removal tool 200 may be disassembled from the sprocket 140. To disassemble, the user may de-couple the lever arm 230 from the shaft 220. The shaft 220 may then be de-coupled from the head 210, such that the two symmetrical pieces of the head 210 are separated.

The installation/removal tool 200 may be made from any suitable material. Multiple materials may be used to form each component of the installation/removal tool 200, or a single material may be used. In some examples, the head 210 and the shaft 220 are made from a metal, such as steel. The head 210 may be made from a steel sheet, while the shaft 220 may be made from a steel pipe or bar stock. The shaft 220 may further include a fastening mechanism, such as a threaded portion and securing member (e.g., nut) to couple the two pieces of the head 210. The material of the installation/removal tool 200 may include a treatment and/or coating to mitigate corrosion, such as paint, galvanization, plating, etc.

The installation/removal tool 200 prevents the user from having to exert immense bodily forces or employ additional hardware, such as a mallet, when trying to remove the sprocket tooth cap 150, which may either injure the user or cause damage to the sprocket 140. The installation/removal tool 200 may thus allow for efficient and consistent removal of the sprocket tooth cap 150 from the sprocket 140 without causing damage to the sprocket 140 or injuring the user.

FIG. 8A is an exploded view of a head 310 that may be used on the installation/removal tool 200, according to an example embodiment. The head 310 includes a slide 312, a slide bracket 314, a pivot bracket 316 having a coupling shaft 318, a plurality of spring pins 326, a spring plunger 324, and a gear assembly 320. The gear assembly 320 includes a gear shaft 320A, a key 320B, a gear 320C, a spacer 320D, and a retaining ring 320E. The gear 320C may be coupled to the gear shaft 320A by way of the key 320B.

The slide 312 and the pivot bracket 316 couple to the slide bracket 314 using the spring pins 326. The slide 312 may be disposed on the slide bracket 314 between a first spring pin on a first side of the slide 312 and a second spring pin on a second side of the slide 312, where the first and second spring pins are coupled to the slide bracket 314. The pivot bracket 316 and the slide bracket 314 may have apertures to facilitate coupling via the spring pins 326. The gear assembly 320 may be coupled to the pivot bracket 316 by inserting the gear shaft 320A through an aperture on the pivot bracket 316. The gear 320C may be disposed within an interior portion of the pivot bracket 316. A first portion of the gear shaft 320A may reside outside of the pivot bracket 316 and a second portion of the gear shaft 320A may reside inside of the pivot bracket 316. The gear assembly 320 couples to the pivot bracket 316 such that the gear 320C, situated on the second portion of the gear shaft 320A, may be in contact with the slide bracket 314. In the embodiment shown, the slide bracket 314 includes grooves that the gear 320C may be in contact with. The first portion of the gear shaft 320A may couple to the lever arm 230 of the installation/removal tool 200. In examples, actuation of the lever arm 230 may cause movement of the head 310 via interaction of the gear assembly 320 with the slide bracket 314. Thus, in some examples, the head 310 may function on a rack and pinion actuation with the slide bracket 314 functioning as the rack and the gear 320C of the gear assembly 320 functioning as the pinion.

The coupling shaft 318 of the pivot bracket 316 may couple to an aperture of the sprocket 140, such as aperture 148 shown in FIG. 2. The aperture may serve as an anchoring point for the installation/removal tool 200. The coupling shaft 316 coupled with the aperture 148 may allow the pivot bracket 316 to remain substantially stationary during use while allowing linear movement to occur in the slide bracket 314. Within examples, the coupling shaft 318 may assist in properly aligning the head 310 with the sprocket tooth cap 150.

In some examples, the slide 312 includes cutouts to facilitate coupling with the slide bracket 314. The cutouts may mirror a dimension, such as a thickness, of the slide bracket 314 to allow the slide bracket 314 to be inserted into the slide 312. In some examples, the cutouts are disposed within a centerline of the slide 312, such that the slide bracket 314 is disposed within the middle of the slide 312. Slide material on either side of the slide bracket 314 may be symmetric. In examples, the slide 312 may be configured to engage with the sprocket tooth cap 150. For example, actuation of the lever arm 230 may produce linear movement of the slide bracket 314 which may engage the slide 312 with the sprocket tooth cap 150. Within examples, the slide 312 may be used on the head 310 for removing the sprocket tooth cap 150 from the sprocket 140. In other examples, the head 310 may not include the slide 312, such as when the head 310 may be used to install the sprocket tooth 150 onto the sprocket 140.

In the example shown, the slide bracket 314 includes a depressor 314A. The depressor 314A may be oriented substantially parallel to the tooth 144 when the head 310 is installed on the sprocket 140. The depressor 314A may have a dimension, for example a thickness, less than the width of the channel 158 of the sprocket tooth cap 150. The depressor 314A may engage the channel 158 during use. For example, the depressor 314A may engage the channel 158 to cause linear movement of the sprocket tooth cap 150. In some examples, the depressor 314A facilitates installation of the sprocket tooth cap 150 onto the tooth 144 of the sprocket 140. In such examples, the lever arm 230 may be actuated in a direction opposite of the removal direction to cause the gear assembly 320 to move the slide bracket 314 radially inward toward the hub 142. Radially inward movement of the slide bracket 314 may cause the depressor 314A to urge, via engagement with the channel 158, the sprocket tooth cap 150 onto the tooth 144. Thus, within examples, the installation/removal tool 200 utilizing the head 310 may function to remove the sprocket tooth cap 150 and/or function to attach the sprocket tooth cap 150 to the sprocket 140.

FIGS. 8B-8C illustrate the installation/removal tool 200, including the head 310, as used on the sprocket 140, according to an example embodiment. FIG. 8B illustrates the head 310 as used in installation of the sprocket tooth cap 150 onto the sprocket 140. FIG. 8C illustrates the head 310 as used in removal of the sprocket tooth cap 150 from the sprocket 140. Thus, the installation/removal tool 200 having the head 310 may facilitate removing and/or attaching the sprocket tooth cap 150 to the sprocket 140. As illustrated in FIG. 8B the head 310 is coupled to the sprocket 140 and the lever arm 230. In this example, the head 310 may not include the slide 312. Actuation of the lever arm 230, for example rotating the lever arm clockwise or counterclockwise, engages the head 310 with the sprocket tooth cap 150 such that the sprocket tooth cap 150 is linearly urged radially inward on the sprocket 140. In such examples, installation of the sprocket tooth cap 150 onto the tooth 144 of the sprocket 140 may occur.

As illustrated in FIG. 8C, the head 310 is coupled to the sprocket 140 having the sprocket tooth cap 150. The lever arm 230 is coupled to the head 310. Actuation of the lever arm 230, for example rotating the lever arm clockwise or counterclockwise, produces linear movement in the slide bracket 314 of the head 310 engaging the slide 312 and/or the slide bracket 314 with the sprocket tooth cap 150. In one example, the direction of actuation of the lever arm 230 engages the head 310 with the sprocket tooth cap 150 such that the sprocket tooth cap 150 is linearly urged radially outward from the sprocket 140. The slide 312 may assist in urging the sprocket tooth cap 150 radially outward from the sprocket 140. In such examples, removal of the sprocket tooth cap 150 from the sprocket 140 may occur.

The head 310 may advantageously allow for removal and replacement of the sprocket tooth cap 150 on the sprocket 140 without having to remove the sprocket 140 and/or loosen and/or remove the flexible member 110. This may reduce the overall downtime of the conveyor system 100, thus reducing costs associated with the downtime. The installation/removal tool 200 utilizing the head 310 may allow for replacement of the sprocket tooth cap 150 without the user exerting immense bodily forces or employ additional hardware, such as a mallet, that may either injure the user or cause damage to the sprocket 140.

Figure 9:
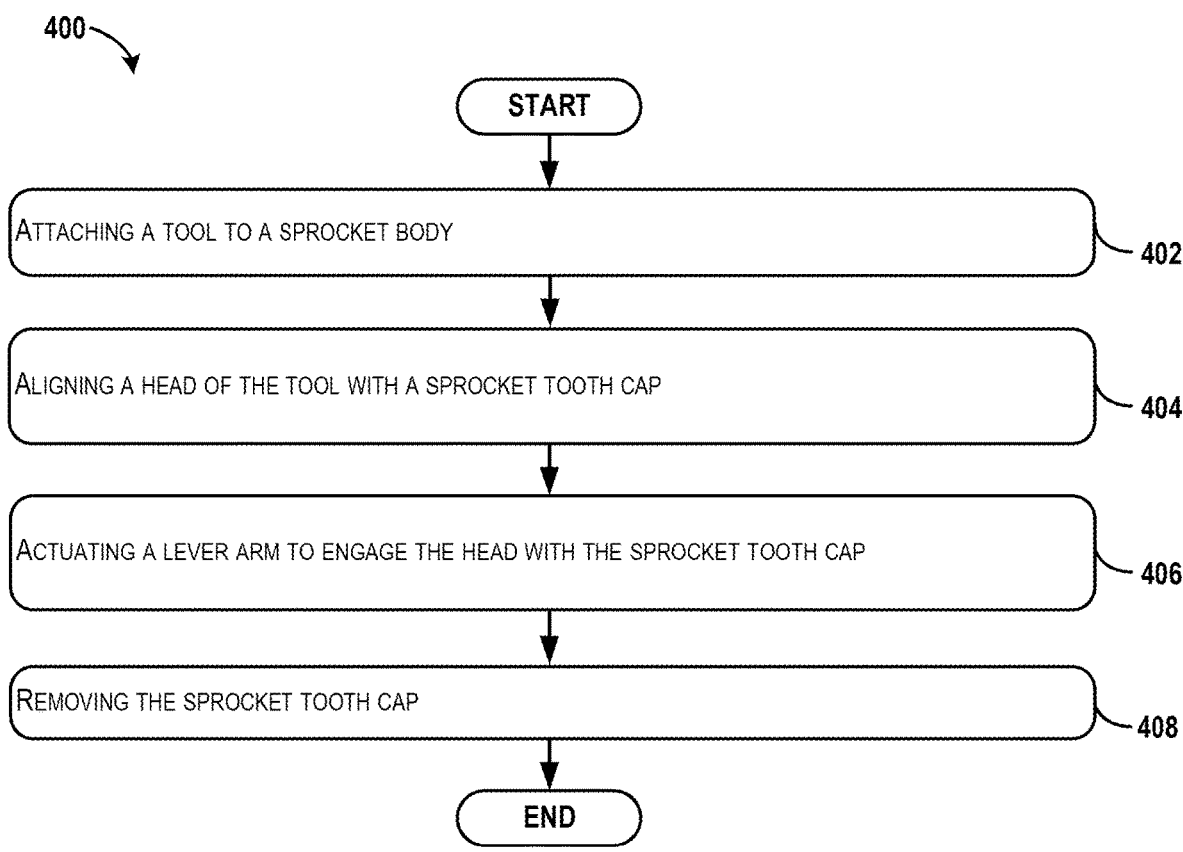
FIG. 9 shows a block diagram of an example method for removing the sprocket tooth cap, according to an example embodiment.

FIG. 9 shows a block diagram of an example method 400 for removing the sprocket tooth cap 150, according to an example embodiment. The method 400 may be performed in connection with the conveyor system 100. During operation of the conveyor system 100, it may be desired and/or necessary to remove and replace the sprocket tooth cap 150 on the sprocket 140. For example, when the sprocket tooth cap 150 is worn through use, removal of may be desired.

At block 402 the method 400 includes attaching a tool to a sprocket body, wherein the tool comprises a lever arm coupled to a head, and a shaft coupled to the head, wherein the shaft is inserted into an aperture of the sprocket body.

At block 404 the method 400 includes aligning the head with a sprocket tooth cap. The sprocket tooth cap includes a body having a first end, and a second end opposite the first end. The first end defines a channel and an engagement face configured to drivingly engage a flexible member. The second end defines a cavity, where the cavity defines a pair of opposite facing surfaces, where the pair of opposite facing surfaces is configured to form an interference fit with a sprocket tooth.

At block 406 the method 400 includes actuating the lever arm to engage the head with the sprocket tooth cap, wherein engagement of the head during actuation causes linear movement in the sprocket tooth cap to urge the sprocket tooth cap radially outward with respect to the sprocket tooth.

At block 408 the method 400 includes removing the sprocket tooth cap from the sprocket tooth.

In some examples, the method 400 additionally includes pressing a second sprocket tooth cap onto the sprocket tooth, the second sprocket tooth cap forming an interference fit with the sprocket tooth. In examples, the second sprocket tooth cap is pressed onto the sprocket tooth using the tool.

Figure 10:
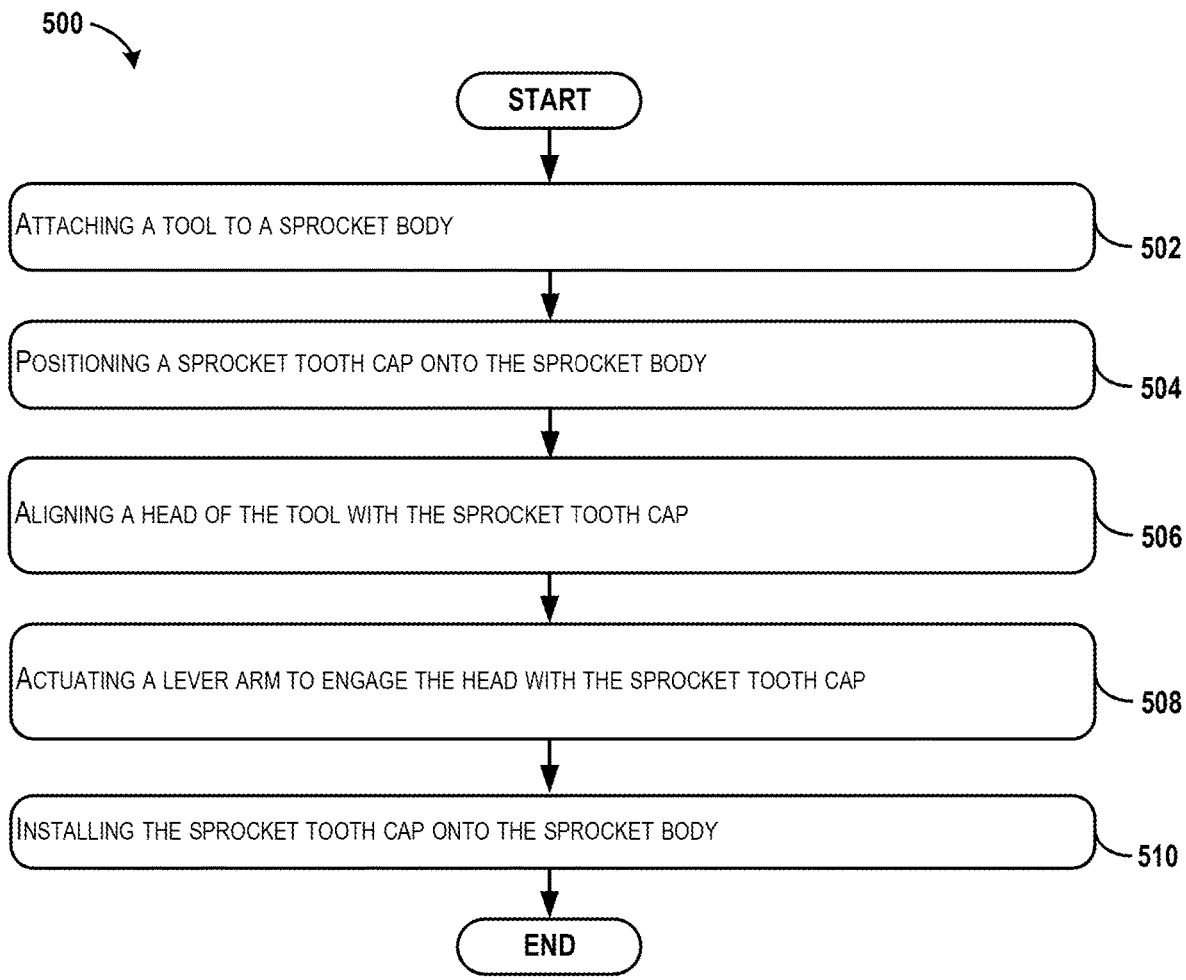
FIG. 10 shows a block diagram of an example method for installing the sprocket tooth cap, according to an example embodiment.

FIG. 10 shows a block diagram of an example method 500 for installing the sprocket tooth cap 150, according to an example embodiment. The method 500 may be performed in connection with the conveyor system 100. During operation of the conveyor system 100, it may be desired and/or necessary to install the sprocket tooth cap 150 on the sprocket 140. For example, when the sprocket tooth cap 150 is worn through use, installation of an unworn (e.g., new) sprocket tooth cap 150 may be desired.

At block 502 the method 500 includes attaching a tool to a sprocket body, wherein the tool comprises a lever arm coupled to a head, and a shaft coupled to the head, wherein the shaft is inserted into an aperture of the sprocket body.

At block 504 the method 500 includes positioning a sprocket tooth cap onto the sprocket body. The sprocket tooth cap comprises a body having a first end, and a second end opposite the first end. The first end defines a channel and an engagement face configured to drivingly engage a flexible member. The second end defines a cavity, where the cavity defines a pair of opposite facing surfaces, where the pair of opposite facing surfaces is configured to form an interference fit with a sprocket tooth.

At block 506 the method 500 includes aligning the head of the tool with the sprocket tooth cap.

At block 508 the method 500 includes actuating the lever arm to engage the head with the sprocket tooth cap, wherein engagement of the head during actuation causes linear movement in the sprocket tooth cap to urge the sprocket tooth cap radially inward with respect to the sprocket body.

At block 510 the method 500 includes installing the sprocket tooth cap onto the sprocket body.

The above detailed description describes various features and functions of the disclosed systems, apparatus, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

In this description, the articles "a," "an," and "the" are used to introduce elements and/or functions of the example embodiments. The intent of using those articles is that there is one or more of the introduced elements and/or functions.

In this description, the intent of using the term "and/or" within a list of at least two elements or functions and the intent of using the terms "at least one of," "at least one of the following," "one or more of," "one or more from among," and "one or more of the following" immediately preceding a list of at least two components or functions is to cover each embodiment including a listed component or function independently and each embodiment including a combination of the listed components or functions.

The use of ordinal numbers such as "first," "second," "third" and so on is to distinguish respective elements rather than to denote an order of those elements unless the context of using those terms explicitly indicates otherwise. Further, the description of a "first" element, such as a first plate, does not necessitate the presence of a second or any other element, such as a second plate.

What is claimed is:

1. A conveyor system comprising:
   a conveyor having an endless loop flexible member and a plurality of inserts disposed on the endless loop flexible member;
   a drive unit configured to rotate a drive shaft;
   a sprocket coupled to the drive shaft, the sprocket drivingly engaged to the endless loop flexible member, the sprocket comprising:
      a hub coupled to the drive shaft and a plurality of teeth extending radially outward from the hub, wherein at least one tooth of the plurality of teeth is substantially planar and comprises a first end and a second end defining a channel, and
      a plate disposed within the channel between the first and second end and fixedly coupled to the tooth; and
   a sprocket tooth cap fixedly coupled via an interference fit to the tooth and the plate, the sprocket tooth cap comprising:
      a body having a first end and a second end opposite the first end,
      the first end defining a channel and an engagement face configured to drivingly engage the endless loop flexible member, and
      the second end defining a cavity, wherein the cavity defines at least one pair of opposite facing surfaces, and wherein the at least one pair of opposite facing surfaces is configured to form an interference fit with the at least one of the plurality of teeth.

2. The conveyor system according to claim 1, wherein the sprocket further comprises a circular aperture radially disposed at distance between the tooth and the hub, wherein the circular aperture is aligned with a centerline of the tooth.

3. The conveyor system according to claim 1, wherein the plate is disposed within the channel perpendicular to the tooth.

4. The conveyor system according to claim 1, wherein the sprocket tooth cap comprises a first material and the tooth comprises a second material different than the first material.

5. The conveyor system according to claim 1, wherein the sprocket tooth cap has a continuous outer surface.

6. The conveyor system according the claim 1, wherein the channel of the sprocket tooth cap engages the endless loop flexible member and the engagement face drivingly engages at least one insert of the plurality of inserts disposed on the endless loop flexible member.

7. The conveyor system according to claim 1, wherein the cavity of the sprocket tooth cap defines a first pair of opposite facing surfaces and a second pair of opposite facing surfaces disposed at an angle to the first pair of opposite facing surfaces, and wherein the first pair of opposite facing surfaces forms the interference fit with the sprocket tooth and the second pair of opposite facing surfaces forms an interference fit with the plate.

8. The conveyor system of claim 7, wherein the angle is substantially 90 degrees.

9. A sprocket assembly comprising:
   a hub defining a bore;
   a plurality of teeth extending radially outward from the hub, wherein at least one tooth of the plurality of teeth is substantially planar and comprises a first end and a second end defining a first channel;
   a plate disposed within the first channel of the tooth; and
   a sprocket tooth cap fixedly coupled via an interference fit to the tooth and the plate, the sprocket tooth cap comprising:
      a body having a first end and a second end opposite the first end,
      the first end defining a second channel and an engagement face configured to drivingly engage a flexible member, and
      the second end defining a cavity, wherein the cavity defines at least one pair of opposite facing surfaces, wherein the at least one pair of opposite facing surfaces is configured to form an interference fit with the at least one of the plurality of teeth.

10. The sprocket assembly of claim 9, further comprising a circular aperture radially disposed at distance between the tooth and the hub, wherein the circular aperture is aligned with a centerline of the tooth.

11. The sprocket assembly of claim 9, wherein the plate is disposed within the channel substantially perpendicular to the tooth.

12. The sprocket assembly of claim 9, wherein the sprocket tooth cap comprises a first material and the tooth comprises a second material different than the first material.

13. The sprocket assembly according to claim 9, wherein the sprocket tooth cap has a continuous outer surface.

14. The sprocket assembly of claim 9, wherein the cavity of the sprocket tooth cap defines a first pair of opposite facing surfaces and a second pair of opposite facing surfaces disposed at an angle to the first pair of opposite facing surfaces, and wherein the first pair of opposite facing surfaces forms the interference fit with the sprocket tooth and the second pair of opposite facing surfaces forms an interference fit with the plate.

15. The sprocket tooth cap of claim 14, wherein the angle is substantially 90 degrees.

16. A sprocket tooth cap for a sprocket assembly, the sprocket tooth cap comprising:
   a body having a first end, and a second end opposite the first end;
   the first end defining a channel and an engagement face configured to drivingly engage a flexible member; and
   the second end defining a cavity, wherein the cavity defines at least one pair of opposite facing surfaces, wherein the at least one pair of opposite facing surfaces is configured to form an interference fit with a sprocket tooth.

17. The sprocket tooth cap of claim 16, wherein the at least one pair of opposite facing surfaces defined by the cavity comprises a first pair of opposite facing surfaces and a second pair of opposite facing surfaces, wherein the second pair of opposite facing surfaces is disposed at an angle from the first pair of opposite facing surfaces.

18. The sprocket tooth cap of claim 17, wherein the angle is substantially 90 degrees.

19. A method comprising:
attaching a tool to a sprocket body, wherein the tool comprises a lever arm coupled to a head, and a shaft coupled to the head, wherein the shaft is inserted into an aperture of the sprocket body;
aligning the tool head with a sprocket tooth cap, the sprocket tooth cap comprising: a body having a first end, and a second end opposite the first end; the first end defining a channel and an engagement face configured to drivingly engage a flexible member; the second end defining a cavity, wherein the cavity defines a pair of opposite facing surfaces, wherein the pair of opposite facing surfaces is configured to form an interference fit with a sprocket tooth;
actuating the lever arm to engage the head with the sprocket tooth cap, wherein engagement of the head during actuation causes linear movement in the sprocket tooth cap to urge the sprocket tooth cap radially outward with respect to the sprocket tooth; and
removing the sprocket tooth cap from the sprocket tooth.

20. The method of claim 19, further comprising:
pressing a second sprocket tooth cap onto the sprocket tooth, the second sprocket tooth cap forming an interference fit with the sprocket tooth.

* * * * *